United States Patent [19]

Paul

[11] Patent Number: 4,729,409

[45] Date of Patent: Mar. 8, 1988

[54] HEXAGONAL UNDERGROUND ELECTRICAL CONDUIT

[75] Inventor: Howard C. Paul, Des Plaines, Ill.

[73] Assignee: Borg-Warner Corporation, Chicago, Ill.

[21] Appl. No.: 405,796

[22] Filed: Aug. 6, 1982

Related U.S. Application Data

[63] Continuation-in-part of Ser. No. 195,201, Oct. 7, 1980, abandoned.

[51] Int. Cl.⁴ ................................................ F16L 9/18
[52] U.S. Cl. ................................... 138/115; 174/68 C; 174/195
[58] Field of Search ............... 138/111, 114, 115, 116, 138/117; 174/95, 97, 68 C; 428/36, 116, 118

[56] References Cited

U.S. PATENT DOCUMENTS

| | | | |
|---|---|---|---|
| 417,992 | 12/1889 | Dell | 138/114 |
| 764,779 | 7/1904 | Stone | 138/115 |
| 3,941,157 | 3/1976 | Barnett | 138/115 |

*Primary Examiner*—James E. Bryant, III
*Attorney, Agent, or Firm*—Richard J. Schlott

[57] ABSTRACT

An underground electrical conduit hexagonal in cross-section and having internal partition walls subdividing the conduit into a plurality of longitudinal ducts. The internal partition walls are symmetrically disposed about a central longitudinal axis of the conduit and serve as bracing structure to strengthen and support the outer walls of the conduit.

3 Claims, 3 Drawing Figures

HEXAGONAL UNDERGROUND ELECTRICAL CONDUIT

CROSS-REFERENCE TO RELATED APPLICATIONS

This application is a continuation-in-part of U.S. application Ser. No. 195,201, filed Oct. 7, 1980, now abandoned.

BACKGROUND OF THE INVENTION

This invention relates to underground electrical conduit, and more particularly to underground electrical conduit having a plurality of channels or ducts for receiving electrical cables or wires. Still more particularly this invention relates to underground electrical conduit having a plurality of channels or ducts for receiving electrical cables including communications cables and the like wherein the channels are formed within the conduit by partition walls which also serve to strengthen and support the exterior walls of the conduit.

Where electrical cables and particularly communications cables are placed underground, conduit is frequently employed to permit the cables to be readily installed and removed for repair and replacement. Conventional underground electrical conduit is generally formed of terra cotta, concrete, fire clay or similar material to provide a strong, rigid structure having the ability to withstand heavy external loading when buried. These conduit are generally rectangular in cross-section and contain a plurality of independent channels or ducts for receiving electrical cable.

Since the density of the materials employed in their construction is quite high, these prior art conduit are made in short sections to reduce weight and thereby facilitate handling and installation. The sections are then joined in the field to form continuous lengths of conduit. Joints between the sections must be carefully made to ensure alignment of the individual ducts and tightly sealed with mortar, pitch or other sealant to prevent the intrusion of subsurface moisture. Installation of these short conduit sections is thus time consuming, and each of the many joints is a potential source of problems due to sealant failure and consequent leakage. Further, though rigid and resistant to compressive loads, these prior art conduit are fragile and breakage during the transporting and installing of the sections is frequently a problem.

More recently a plastic conduit of rectangular cross-section has been introduced to the field. These plastic conduit, injection molded from structural foam, are also generally made in short sections and joined in the field to form a continuous length of conduit. The injection-molded structural foam conduit has the advantages of being lighter in weight than an equivalent concrete conduit and of resisting breakage during installation. However, the outer walls of plastic conduit must be made thick enough to withstand external compressive loads without being crushed or deflected to a degree that will distort and constrict the individual ducts. The need for increased wall thickness in turn increases the amount of plastic material employed, thereby increasing the overall weight and cost of these conduit.

Still more recently, as was disclosed in U.S. Pat. No. 3,941,157, an extruded plastic conduit was introduced for use as underground conduit. The extruded conduit includes longitudinal ribs to reinforce the external walls and provide improved rigidity and load bearing characteristics, as compared with the injection molded conduit previously described. Although the conduit may be extruded in a variety of cross sections including rectangular and circular, the use of external reinforcing ribs to resist bending and crushing raises the volume of plastic material used and increases the complexity of the extrusion process.

The prior art has thus not provided an extruded conduit designed with the strength and rigidity to resist crushing and deflection under compressive loads without resorting to thick external walls and/or the use of reinforcing ribs.

BRIEF SUMMARY OF THE INVENTION

The underground conduit of the instant invention is substantially hexagonal in cross-section, having within a plurality of partition walls which serve as bracing means to strengthen and support the outer walls, and which subdivide the conduit to form channels or ducts for receiving electrical cable. The partition walls are symmetrically disposed with respect to the central longitudinal axis of the conduit to form ducts that are self-aligning, permitting the ready joining of conduit sections in the field. The hexagonal configuration, having outer walls braced by internal partition walls, has sufficient design strength to provide superior resistance to crushing and deflection under the compressive loads encountered in underground installation without resort to use of increased wall thicknesses. The conduit of this invention is readily formed by extrusion and thus may be made in any conveniently handled length. Long conduit sections may be cut to any required length in the field and joined as necessary and even mitre cut and joined to form bends as needed.

DESCRIPTION OF THE PREFERRED EMBODIMENT

Figure 1:
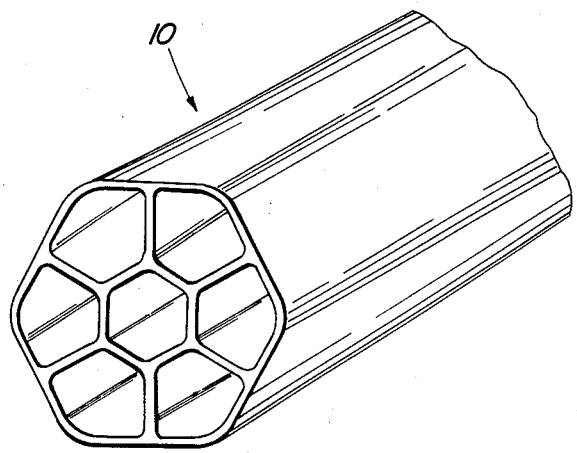
FIG. 1 is a perspective view of a section of conduit constructed in accord with the principles of this invention.
Figure 2:
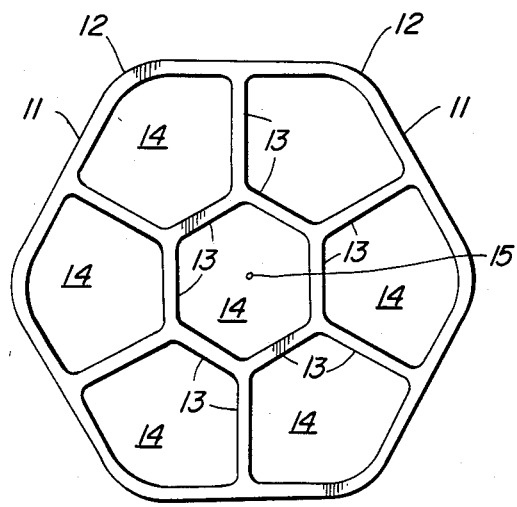
FIG. 2 is a transverse view of the conduit of FIG. 1 showing the placing of the partition walls.

Referring now to the drawings, in FIGS. 1 and 2, there is shown a conduit 10 constructed according to principles of this invention, having six outer walls 11 together forming a regular hexagon with arcuate vertices 12. Partition walls 13 and 13a subdivide the interior space of conduit 10 into seven longitudinal channels or ducts 14. The partition walls 13 and 13a are continuous throughout the length of conduit 10, forming continuous, separate and non-communicating ducts 14.

The partition walls are disposed symmetrically with respect to the central longitudinal axis of the conduit to provide a self-aligning, self-orienting conduit. In addition, each of the ducts is capable of accommodating cables of the same size i.e., cables having the same circular diameter.

Turning to FIG. 2, the conduit 10 is shown in transverse section, wherein it will be apparent that the partition walls 13 and 13a are disposed in a fashion to provide six-fold symmetry about a longitudinal axis 15. An end of conduit 10 may thus be joined to an end of a second conduit of the same configuration in any of six orientations with complete self-alignment of each of the partition walls. Each of channels 14 will accommodate a cable of the same maximum diameter, and a cable inserted into any of channels 14 will rest on no more than two partitions. Each of partition walls 13, those contacting an outer wall, extend normally inward from an outer wall 11, meeting and joining two further partition walls 13a (those not in contact with an outer wall) at an angle of approximately 120°.

Conduit having the hexagonal configuration shown in FIG. 2 exhibits substantial resistance to crushing and to deflection of the outer walls under the compressive loads encountered in underground installation. When laid underground the conduit will rest on any of the outer walls 11. Each arcuate vertex 12, having the form of an arch, has great strength to withstand an external load. Each partition wall 13 extends normally inward from and is integral with an outer wall 11 and acts as a rib to stiffen the outer wall and resist deflection under compressive loads. Each partition wall 13 is in turn joined and buttressed at equal angles of 120° by two further partition walls 13a which through further partition walls 13 and 13a contact the remaining outer walls 11. Taken together, the partition walls 13 and 13a form bracing means which support and greatly strengthen outer walls 11, distributing the load throughout the structure and thus preventing crushing and minimizing inward deflection under the external load supplied by the surrounding earth fill.

The principles set forth in providing a hexagonal conduit having internal ducts formed by symmetrically disposed partition walls which serve as bracing means to strengthen the outer walls is not restricted to a conduit having seven internal passages.

Figure 3:
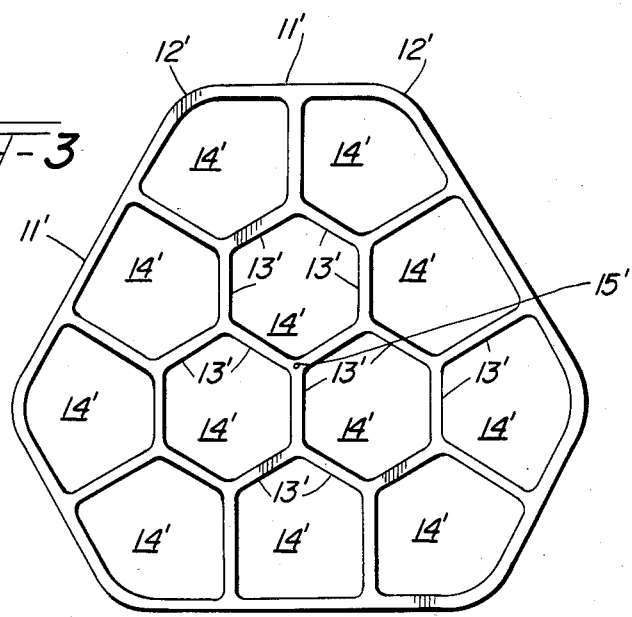
FIG. 3 is a transverse sectional view of an alternate embodiment of the invention.

Turning now to the alternate embodiments shown in FIG. 3, there is shown in FIG. 3 a conduit 10' having twelve ducts 14' formed by the partition walls 13'. Three outer walls 11' and three outer walls 11" define an equiangular hexagon with arcuate vertices 12'. The conduit of this embodiment thus has three-fold symmetry about a central axis 15'. An end of a conduit having the structure of the embodiment shown in FIG. 3 may thus be joined to an end of a second conduit of the same configuration in any of three orientations. It will be apparent that the hexagonal conduit of this invention may be constructed with as few as seven ducts or greater number, in the regular geometric progression of 7, 12, 18, etc. by incorporating partition walls symmetrically disposed about the longitudinal axis of the conduit to provide equally sized self-aligning ducts and internal bracing of the outer walls.

The hexagonal conduit of this invention will be formed by any conventional pipe extrusion process from an extrudable plastic resin. Extrudable plastic resins useful for the purpose of forming the hexagonal conduit of this invention include both thermoplastic and thermosetting resins such as for example polyolefin resins, ABS resins, polyamide resins, polyester resins, polyacrylate resins, extrudable urethane resins, extrudable phenolic resins and the like, as well as blends and mixtures thereof. The resins may be further filled or fiber-reinforced as desired, and may be extruded in the form of structural foam to provide a further reduction in weight and costs of the materials employed. Although the use of rigid thermoplastic resins will be preferred, the use of flexible elastomeric resins is not excluded.

The hexagonal conduit of this invention provides several advantages for use in the installation of underground electrical cable and particularly communications cable. The conduit of this invention may be made by extrusion in any conveniently-handled length, thus decreasing the number of joints to be made and speeding the installation. Self-alignment of the internal partitions and ducts permits the butting together and rapid joining of sections, and the use of conventional plastics joining methods such as heat welding, solvent welding and cementing provides for strong, secure, moisture impervious joints between conduit sections.

Further, the conduit of this invention may be cut in the field to any necessary length, butted together and joined, and even mitre cut at complementary angles and joined to form bends. Prior art conduit, particularly when formed of concrete, clay or the like, are extremely difficult to cut in the field and cut sections are not readily joined, necessitating the use of specially manufactured odd lengths and transition sections.

The added strength of the hexagonal conduit when supported by bracing means in the form of the partition walls permits a reduction in wall thicknesses by as much as 20%, saving a considerable amount of plastic material and allowing a substantial saving in weight and costs when compared with conventional injection molded rectangular conduit.

The instant invention will thus be seen to be an underground electrical conduit hexagonal in crosssection and having a plurality of longitudinal ducts for receiving electrical cables, said ducts being formed by internal partition walls symmetrically disposed about the longitudinal axis of the conduit, and said partition walls serving as bracing means to strengthen and support the exterior walls. Further modifications including the use of tapered wall thicknesses and the addition of filleted areas at the junctures between partitions will be apparent to those skilled in the art and may be made without departing from the spirit and scope of the invention as described herein and set forth in the following claims.

What is claimed is:

1. In a conduit for electrical cable having outer walls and a plurality of partition walls subdividing said conduit into a plurality of longitudinal ducts, the improvement wherein the outer walls of said conduit define an equiangular hexagon having arcuate vertices, the partition walls are symmetrically disposed about the longitudinal axis of said conduit to form at least seven longitudinal ducts, each of said partition walls in contact with one of said outer walls is normal thereto, and said ducts are of equal size as defined by the maximum diameter circular cable that may be inserted therein.

2. The conduit of claim 1 wherein each of said partition walls in contact with said outer walls extends normally inwardly therefrom and wherein each of said partition walls joins at least two additional partition walls at angles of 120°.

3. The conduit of claim 1 wherein said conduit and said interior partition walls are integrally formed from a thermoplastic resin by an extrusion process.

* * * * *